United States Patent
Gulvin et al.

(10) Patent No.: US 7,224,883 B2
(45) Date of Patent: May 29, 2007

(54) ACTUATOR AND LATCHING SYSTEMS AND METHODS

(75) Inventors: Peter M. Gulvin, Webster, NY (US); Yao Rong Wang, Webster, NY (US); Jun Ma, Penfield, NY (US); Kathleen A. Feinberg, Rochester, NY (US); Pinyen Lin, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 71 days.

(21) Appl. No.: 11/094,408

(22) Filed: Mar. 31, 2005

(65) Prior Publication Data

US 2006/0222287 A1   Oct. 5, 2006

(51) Int. Cl.
*G02B 6/00* (2006.01)

(52) U.S. Cl. ...................... 385/141; 385/129
(58) Field of Classification Search ............ 385/16, 385/24, 141, 129
See application file for complete search history.

(56) References Cited

U.S. PATENT DOCUMENTS

| | | | |
|---|---|---|---|
| 5,364,742 A * | 11/1994 | Fan et al. | 430/317 |
| 5,994,816 A * | 11/1999 | Dhuler et al. | 310/307 |
| 6,229,640 B1 * | 5/2001 | Zhang | 359/290 |
| 6,275,320 B1 * | 8/2001 | Dhuler et al. | 359/237 |
| 6,360,033 B1 * | 3/2002 | Lee et al. | 385/18 |
| 6,459,845 B1 * | 10/2002 | Lee et al. | 385/140 |
| 6,590,313 B2 * | 7/2003 | Agrawal et al. | 310/307 |
| 6,734,597 B1 * | 5/2004 | Howell et al. | 310/306 |
| 6,804,036 B1 * | 10/2004 | Chen et al. | 359/237 |
| 6,904,191 B2 * | 6/2005 | Kubby | 385/16 |
| 7,003,188 B2 * | 2/2006 | Hsu et al. | 385/16 |
| 2004/0184720 A1 * | 9/2004 | Kubby | 385/22 |
| 2006/0127029 A1 * | 6/2006 | Lin et al. | 385/140 |

* cited by examiner

*Primary Examiner*—Ellen E. Kim
(74) *Attorney, Agent, or Firm*—Oliff & Berridge, PLC

(57) ABSTRACT

An optical switch for routing signals includes a latch receiver connected to a waveguide that routes the signals and an actuator that includes an upper plate, a lower plate and a latch connected to the lower plate, the lower plate of the actuator moving vertically when power is applied to the lower plate, causing the latch to move vertically and engage the latch receiver. A latching system includes a switch that includes a latch formed to include an extension on one end of the latch, the latch being driven by power, a latch receiver that is formed to receive the latch and a controller that controls the extension of the latch to engage the latch receiver when the power is applied to the latch, and controls the extension of the latch to lock in place against the latch receiver when the power is removed from the latch.

15 Claims, 15 Drawing Sheets

FIG. 10A
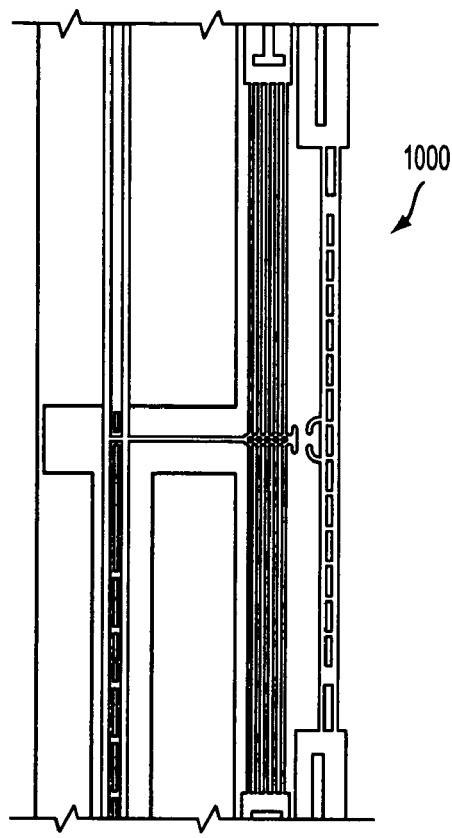
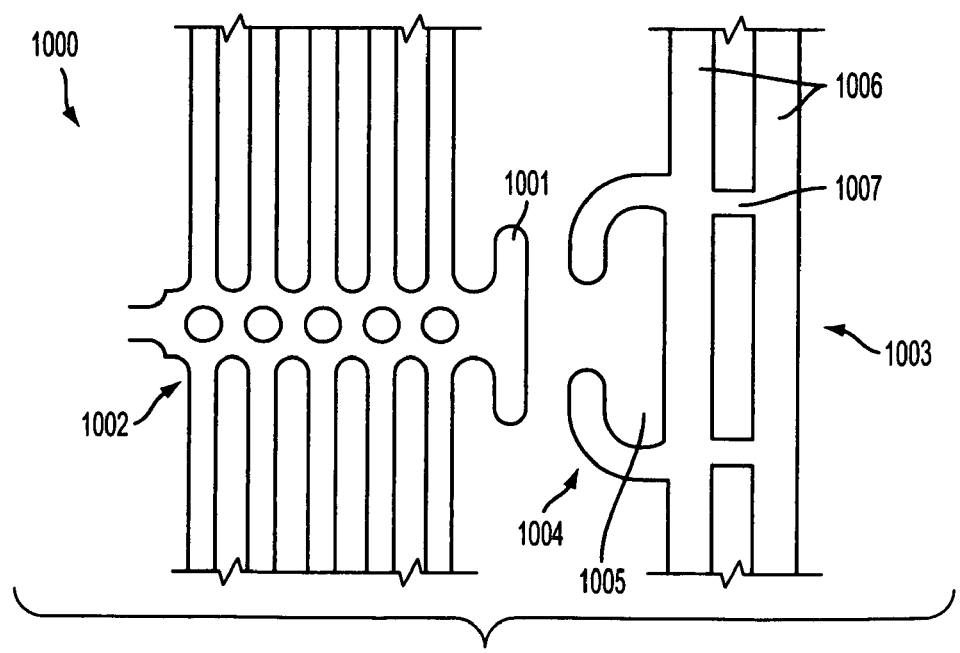
FIG. 10B

FIG. 12A
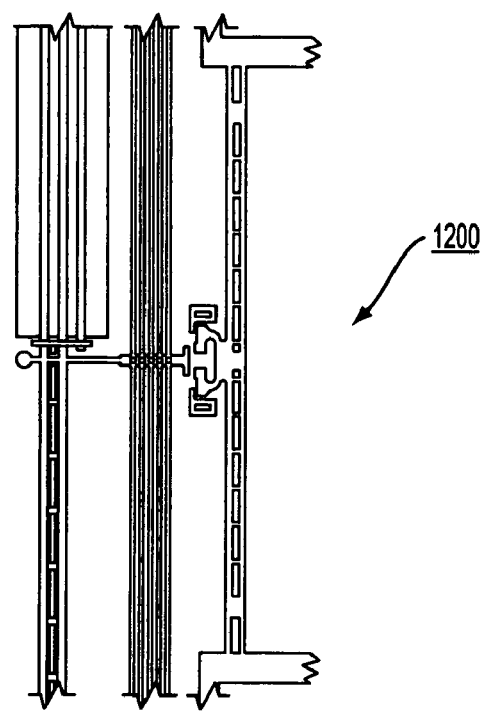
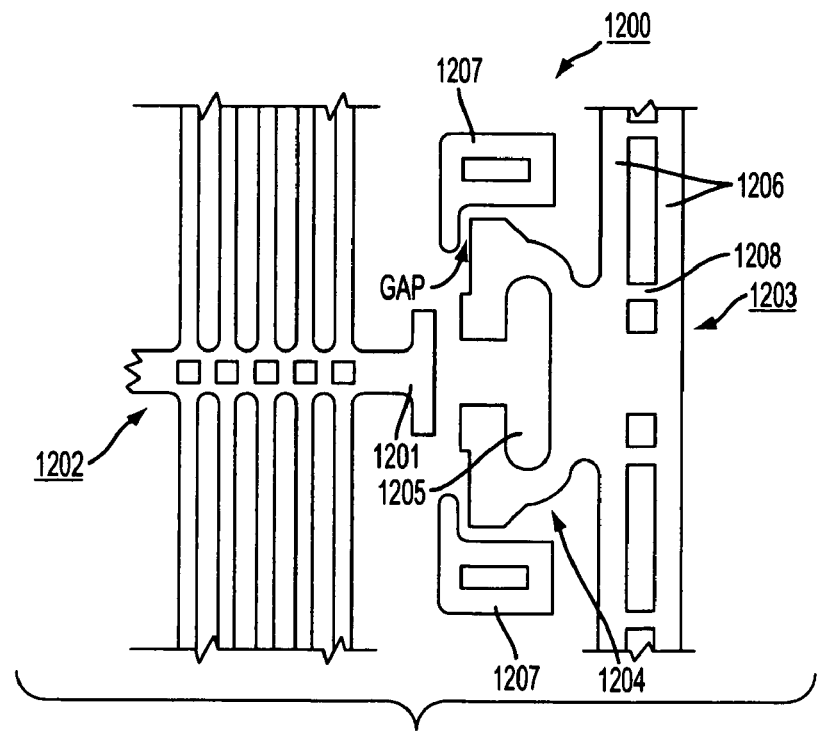
FIG. 12B

ACTUATOR AND LATCHING SYSTEMS AND METHODS

BACKGROUND

1. Field of Invention

This invention relates to switches. More specifically, the systems and methods of the invention relate to actuator and latching systems and methods that may be used in a switch.

2. Description of Related Art

Micro-electromechanical (MEMS) technology switches are used in many applications. For example, a MEMS switch may be used in microfluidics to open and close a valve, or to direct a flow of fluid through a pipe. Optical communications systems may utilize large amounts of bandwidth. In order to improve efficiency, many optical communications systems utilize MEMS optical switches. The switches may be used in optical communications systems to control a lightwave through a waveguide or to add/drop channels in a multiplexer. For example, the optical switches may add or drop input signals from a fiber optic source to a different fiber optic output port sometimes using optical multiplexers. The optical switches may also include both a shuttle mechanism that holds a routing waveguide structure, and an actuator that physically moves the shuttle mechanism.

Conventional optical switches typically use separate components for the optical switch and the switch actuator. The optical switch may also include a latching mechanism to lock the position of the shuttle in place to save power and to prevent a loss of a switch position during a power failure. Conventional latching mechanisms have been formed to include a pair of V-shaped thermal actuators that move away from each other when power is applied to the actuators. The movement opens a path for a latch to move through. When power is removed and the thermal actuators relax, a distance between the thermal actuators decreases to secure the latch and the shuttle is held in a predetermined position.

The conventional latches discussed above are quite large and consume too much space for a MEMS device. For example, the latches are formed to be 100 μm in a parallel direction to the waveguides and 400 μm in a perpendicular direction to the waveguides. When an array of switches using the conventional latches is integrated into a multiplexer, the size of the switches in the perpendicular direction greatly increases the overall size of a chip. For example, when using a 32- or 64-channel system, the 400 μm width of the latch adds 1.28 cm or 2.56 cm to the width of the chip, respectively, resulting in chips that can be 4 cm wide. Chips that are formed to be 4 cm wide result in an increased manufacturing cost and are difficult to package.

SUMMARY

Based on the problems discussed above, there is a need for an improved actuator and latching system, and methods that may be used in a switch and will reduce the amount of space used in the chip.

An optical switch for routing signals includes a latch receiver connected to a waveguide that routes the signals and an actuator that includes an upper plate, a lower plate and a latch connected to the lower plate, the lower plate of the actuator moving vertically when power is applied to the lower plate, causing the latch to move vertically and engage the latch receiver.

A latching system may include a switch that includes a latch formed to include an extension on one end of the latch, the latch being driven by power, a latch receiver that is formed to receive the latch and a controller that controls the extension of the latch to engage the latch receiver when the power is applied to the latch, and controls the extension of the latch to lock in place against the latch receiver when the power is removed from the latch.

A method of using a latching system may include a switch, the method includes driving a latch receiver formed to receive a latch by applying power to the latch receiver, driving the latch that includes an extension on one end of the latch by applying power to the latch and controlling the extension of the latch to engage the latch receiver when the power is applied to the latch, and controlling the extension of the latch to lock in place against the latch receiver when the power is removed from the latch.

In accordance with various exemplary embodiments, an optical switch may embed a latching system into an integrated actuator. The optical switch may be formed using MEMS microfabrication techniques such as surface micromachining or bulk micromachining.

For reasons of convenience, the embodiments of the disclosure will be discussed using an optical switch in conjunction with an optical add/drop multiplexer within an optical communications system. However, it should be appreciated by one skilled in the art that the latch systems and methods may be used with any switching system without departing from the sprit and scope of the disclosure.

BRIEF DESCRIPTION OF THE DRAWINGS

Various exemplary embodiments of the systems and methods according to the invention will be described in detail, with reference to the following figures, wherein:

FIGS. 10A-B are exemplary diagrams of another embodiment of a latching system;

FIGS. 12A-B are exemplary diagrams of another embodiment of a latching system;

DETAILED DESCRIPTION OF EMBODIMENTS

Figure 1:
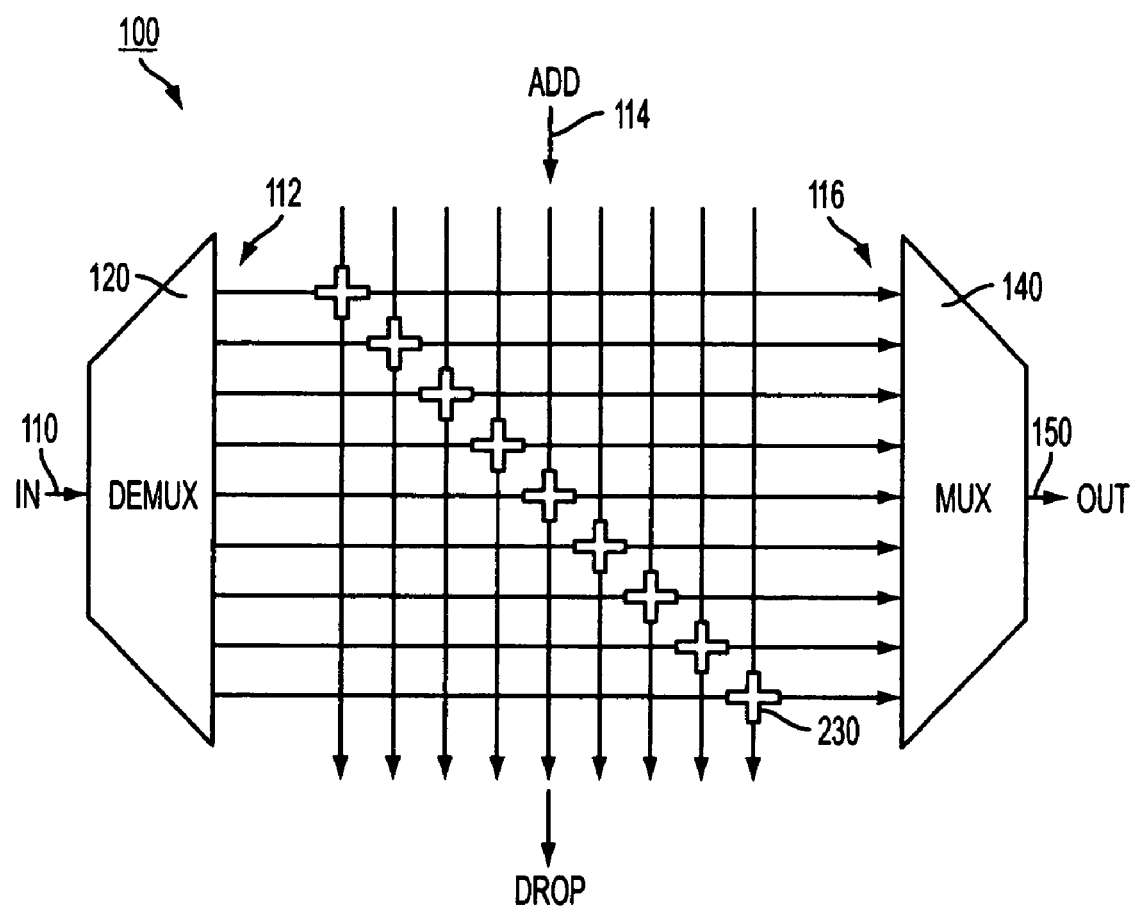
FIG. 1 is an exemplary diagram of an optical communications system.

FIG. 1 is an exemplary diagram of an optical communications system. In various exemplary embodiments, the optical communication system may be an optical add/drop multiplexer 100. The optical communication system in FIG. 1 is shown for exemplary purposes only and may include, for example, 8, 16, 32 or 64 channels. As shown in FIG. 1, the optical add/drop multiplexer 100 may receive an input optical signal 110 with many optical channels at different wavelengths from a single optical fiber. The input optical signal 110 is demultiplexed by demultiplexer 120 into separate optical channels 112 based on the wavelengths of the optical channels 112. Once the input optical signal 110 is demultiplexed, each of the separate optical channels 112 encounters one of a plurality of optical switches 230. The optical switches 230 may either pass or drop out the respective one of the optical channels 112. For any of the optical channels 112 that are dropped, a new signal 114 may be added by the optical switches 230 to further utilize that channel. Channels 116 that are passed or added by the optical switches 230 are remultiplexed by a multiplexer 140 into an output optical signal 150 and output to another single optical fiber. Because the channels may be dropped and added by the optical add/drop multiplexer 100, the output optical signal 150 may include a modified data stream as compared to the input optical signal 110.

Figure 2:
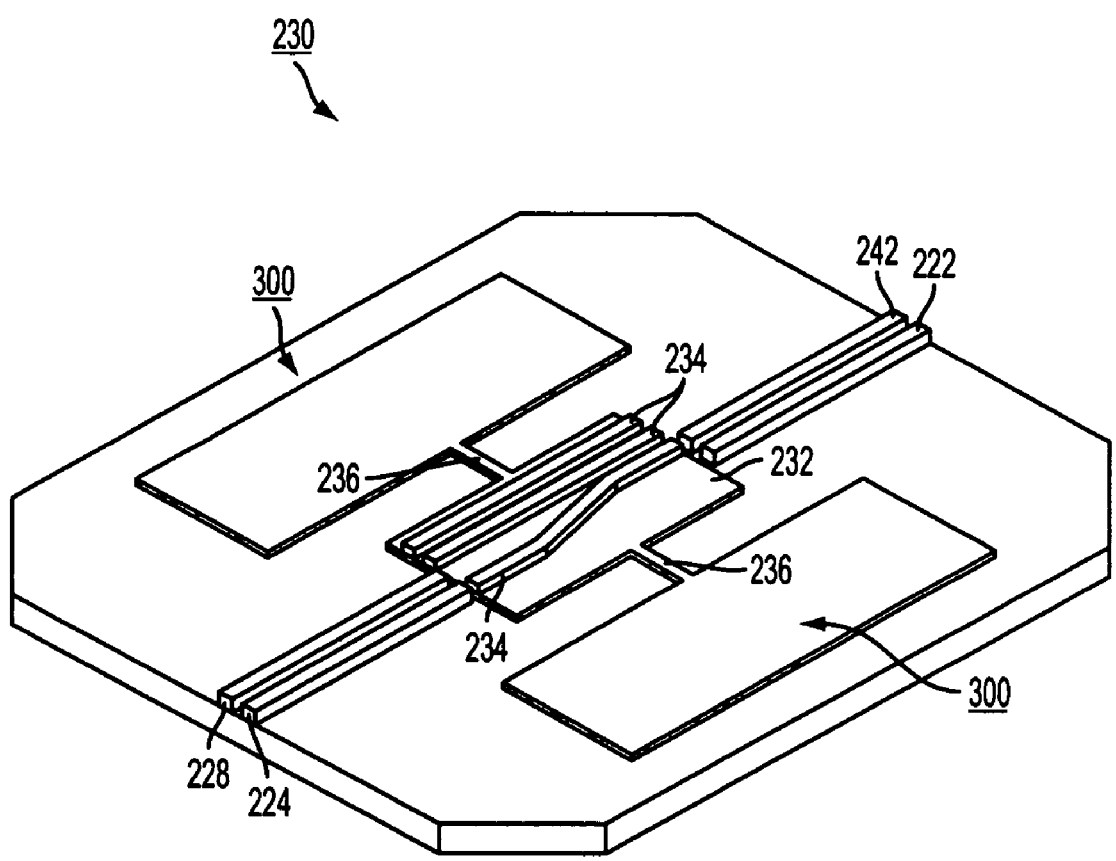
FIG. 2 is an exemplary diagram of an optical switch that may be used within the optical communications system of FIG. 1.

FIG. 2 is an exemplary diagram of an optical switch 230 that may be used within the optical communications system shown in FIG. 1. As shown in FIG. 2, the optical switch 230 may be used as a waveguide switch or optical changeover switch. The optical switch 230 includes a shuttle 232 with a plurality of waveguides 234. An input waveguide 222 corresponding to one of the channels 112 from the optical add/drop multiplexer 100 and a waveguide 242 for carrying the new signal 114 to be added are disposed on one of the waveguides 234. Similarly, an output waveguide 224 corresponding to one of the channels 116 of the optical add/drop multiplexer 100 and a waveguide 228 for dropping a signal are situated at the other end of the waveguides 234.

As indicated by the arrows in FIG. 2, the shuttle 232 may be driven or moved transversely by a pair of actuators 236. The actuators 236 may be of any suitable type, such as, for example, a thermal actuator, electrostatic actuator, magnetic actuator or piezoelectric actuator. The waveguides 234 are configured so that the transverse movement of the shuttle 232 will switch between one of the waveguides 234 connecting the input waveguide 222 to the output waveguide 224 and one of the waveguides 234 connecting the waveguide 242 carrying the new signal 114 to the output waveguide 224. To drop the signal of the input waveguide 222, one of the waveguides 234 can connect to the input waveguide 222 to the waveguide 228.

Figure 3:
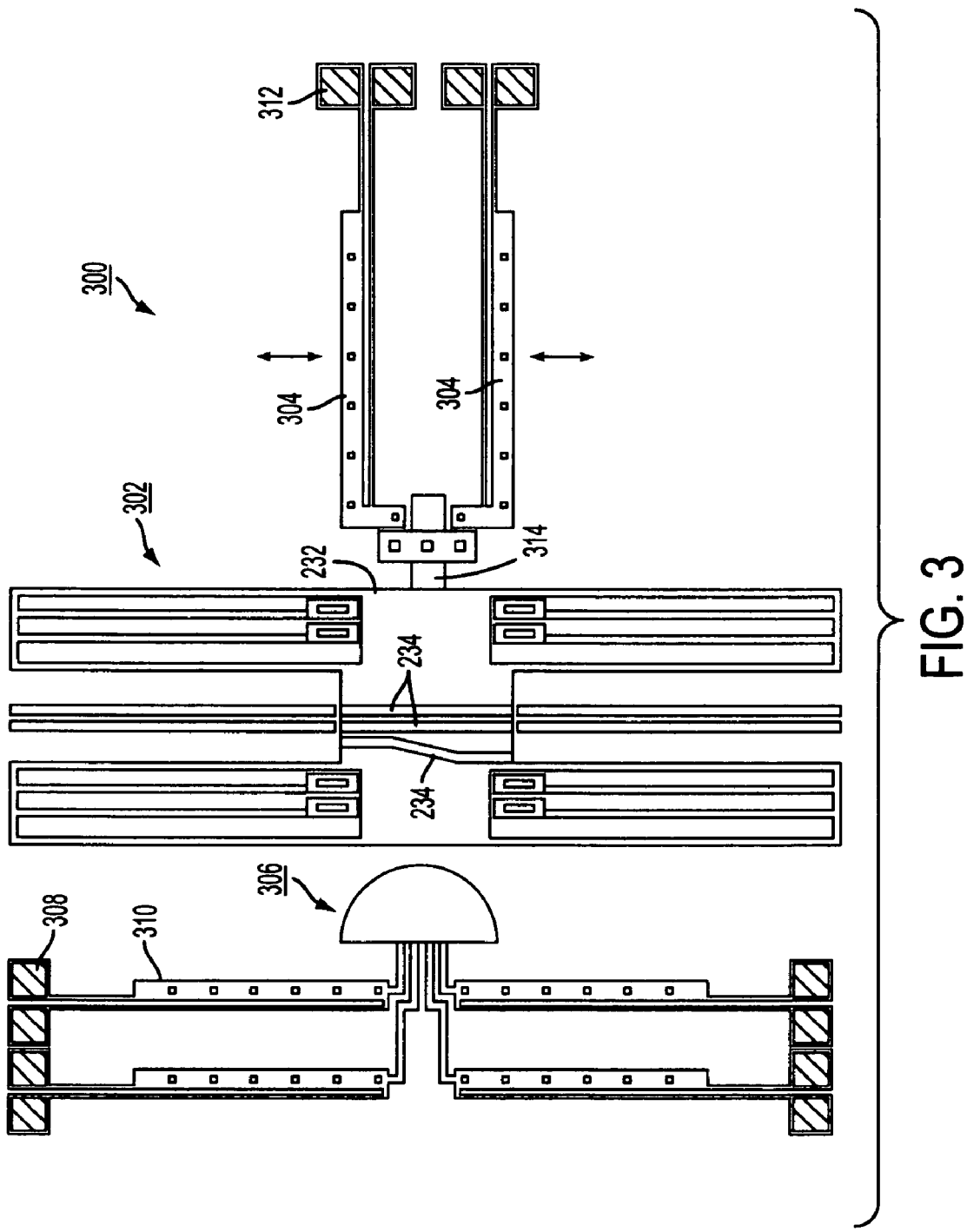
FIG. 3 is an exemplary diagram of an optical switch with a conventional latch and actuators.

FIG. 3 is an exemplary diagram of an optical switch with a conventional latch and actuators. As shown in FIG. 3, the optical shuttle device 300 includes thermal actuators 310 that have a stiffness, an actuator head 306 and springs 302. The actuator head 306 is connected to the thermal actuators 310. The springs 302 are connected to the shuttle 232 and are also fastened to the optical switch 230 (shown in FIG. 2). The springs 302 have a resistance or stiffness, and thus suspend the shuttle 232 so that it can be properly guided when driven. The optical shuttle device 300 also includes electric terminals 308 that are connected to the thermal actuators 310. The optical shuttle device 300 also includes latch thermal actuators 304 that are connected to electric terminals 312.

The optical shuttle device 300 in FIG. 3 is in a non-latched position whereby no power has been applied to the electric terminals 308 and the thermal actuators 310 are not displaced from a retracted position or an equilibrium position. Because the actuator head 306 does not contact the shuttle 232, the optical shuttle 232 is in a first location. However, when power is applied to the electric terminals 308, thermal expansion occurs in the thermal actuators 310 causing the thermal actuators 310 to be displaced from their retracted position. When the thermal actuators 310 are displaced, the actuator head 306 contacts the shuttle 232 and drives the shuttle 232 from an unlatched position (shown in FIG. 3) to a latched position (shown in FIG. 4). Because the shuttle 232 includes the optical component with the waveguides 234, the optical shuttle device 300 functions as a switch when it is driven by the actuator head 306 by controlling the waveguides 234 on the shuttle 232 to align with the various waveguides within the optical add/drop multiplexer 100. This function controls the direction of optical signals within the optical communications system.

Figure 4:
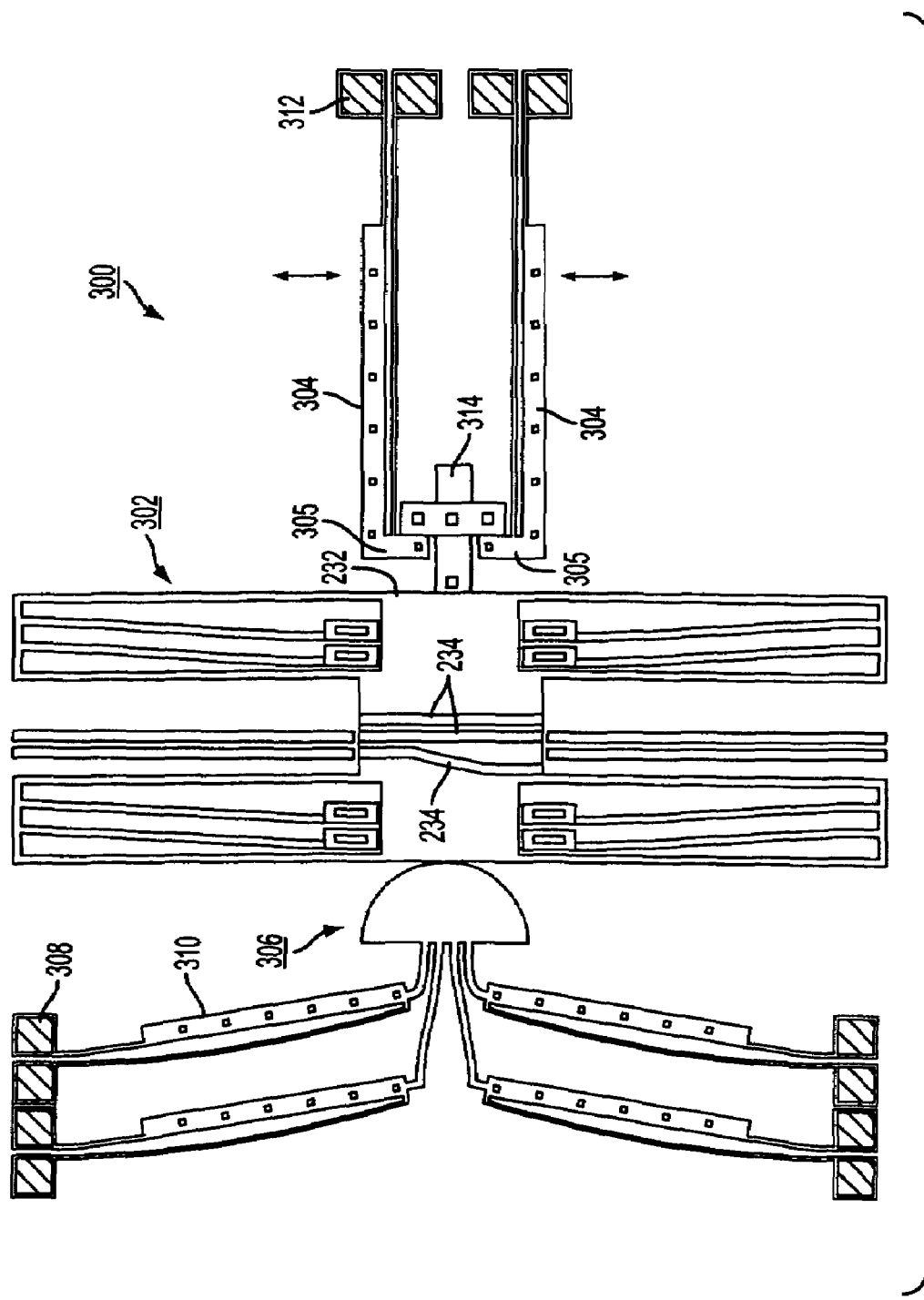
FIG. 4 is an exemplary diagram of the conventional latch locked in position.

FIG. 4 is an exemplary diagram of the conventional latch in a locked position. As shown in FIG. 4, after power has been applied to the electric terminals 312, the latch thermal actuators 304 are driven to open up the latching teeth 305 during the switch and close the teeth 305 to lock the waveguide in the second location. The arrows show the direction of movement by the thermal actuators 304. When the thermal actuators 310 are displaced out of an equilibrium position, the stiffness (or resistance) that creates a restoring force in the thermal actuators 310 is overcome to displace the shuttle 232. Furthermore, the springs 302 are also folded and displaced as shown in FIG. 4 so that the movement of the shuttle 232 overcomes a restoring force in the springs 302. The folded springs 302 also supply a restoring force to return the shuttle 232 back to its equilibrium position. Once the shuttle 232 is driven to the predetermined position, the shuttle 232 is latched in place by applying power to the electric terminals 312, which causes the latch thermal actuators 304 with the teeth 305 to open up so that the latch 314 can be positioned inside of the teeth 305. The power is removed from the electric terminals 312 and the teeth 305 of the thermal actuators 304 close around the latch 314 and lock the shuttle 232 in place.

The conventional latch shown in FIGS. 3 and 4 shows an example of a latch arranged to include two sets of in-plane actuators with first actuators moving the shuttle to a desired position, and second actuators moving with respect to the shuttle to lock the shuttle position in place. As discussed above, the conventional arrangement of the thermal actuators consumes too much space. Thus, the switch arrangement increases the cost of the chips.

Figure 5A:
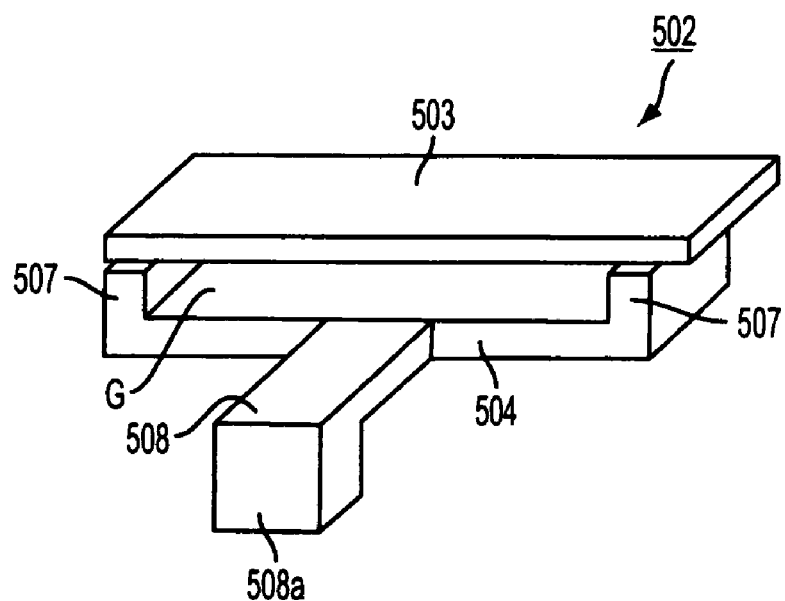
FIGS. 5A-B are exemplary diagrams of an embodiment of a latching system.
Figure 5B:
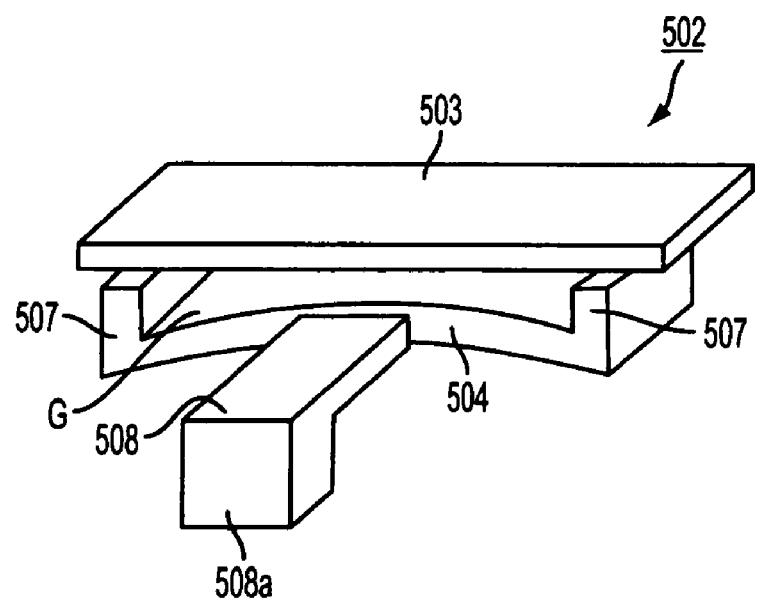

FIGS. 5A-B are exemplary diagrams of an embodiment of a latching system. As shown in FIG. 5A, the latching system includes a vertical actuator 502 formed to include an upper plate 503, a lower plate 504 and a latch 508. The lower plate 504 is composed of a material that is more flexible that the upper plate 503. The latch 508 is formed to include an extension 508a on one end of the latch 508 so that the latch 508 is hook-shaped and may engage a latch receiver. The latch receiver may be shaped like the latch receiver 803 in FIG. 9A. The upper plate 503 and lower plate 504 may be separated by spacers 507 that form a gap G. The vertical actuator 502 may be driven by actuating forces such as electrostatic, thermal, electromagnetic, magnetic or piezoelectric forces. For example, an electrostatic force may be applied to the vertical actuator 502 in FIG. 5A to create an electrical field between the upper plate 503 and the lower plate 504. As shown in FIG. 5B, because the lower plate 504 is composed of a more flexible material than the upper plate 503, the electric field causes the lower plate 504 to move vertically towards the upper plate 503. This movement subsequently drives the latch 508 and the extension 508a vertically so that the latch 508 may be positioned to engage the latch receiver. Once the power is removed from the vertical actuator 502, the lower plate 504 returns to the position shown in FIG. 5A and grasps the latch receiver so that the switch is held in a predetermined position.

Figure 6A:
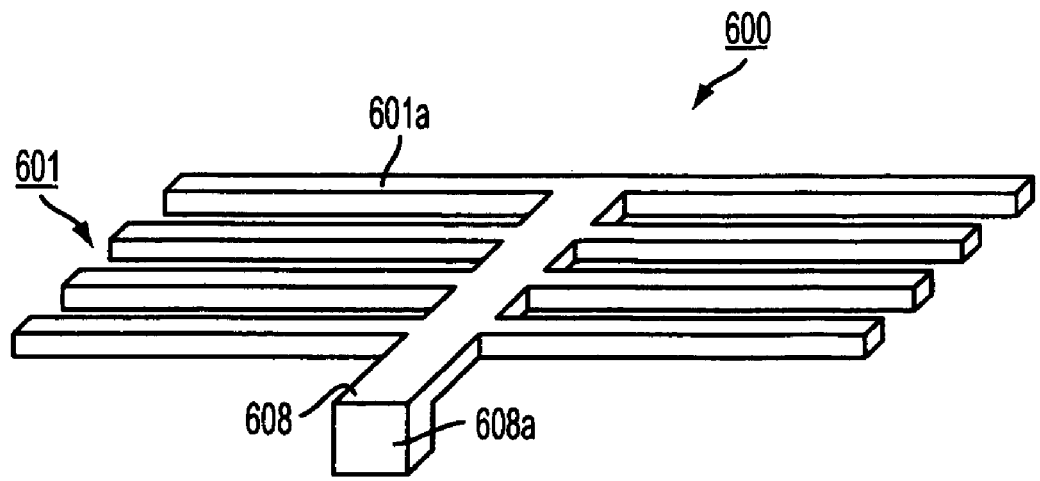
FIGS. 6A-B are exemplary diagrams of another embodiment of a latching system.
Figure 6B:
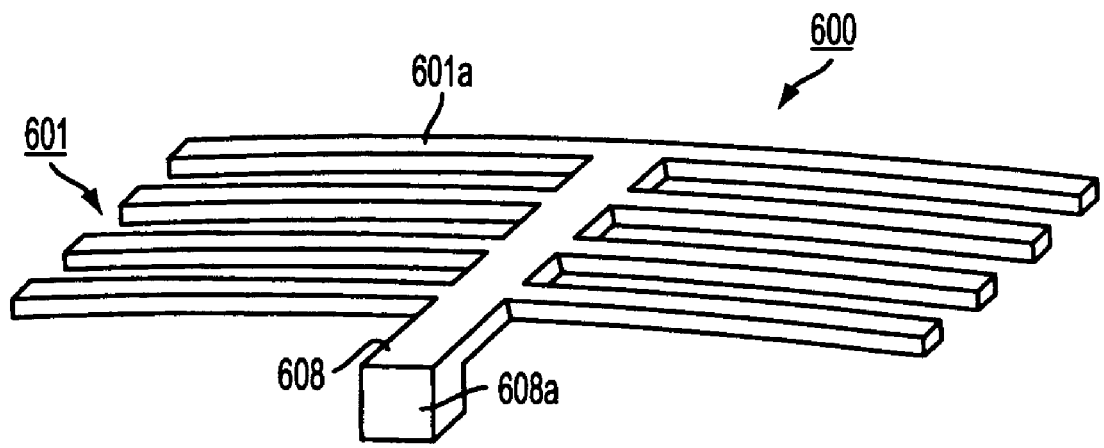
Figure 7A:
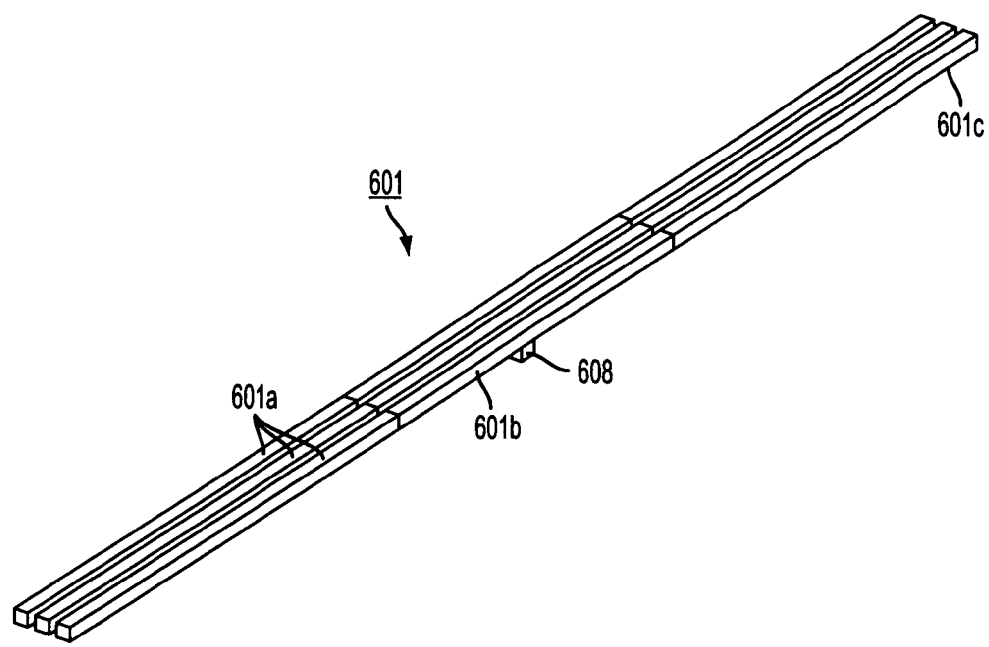
FIGS. 7A-B are exemplary diagrams of an embodiment of thermal actuators.
Figure 7B:
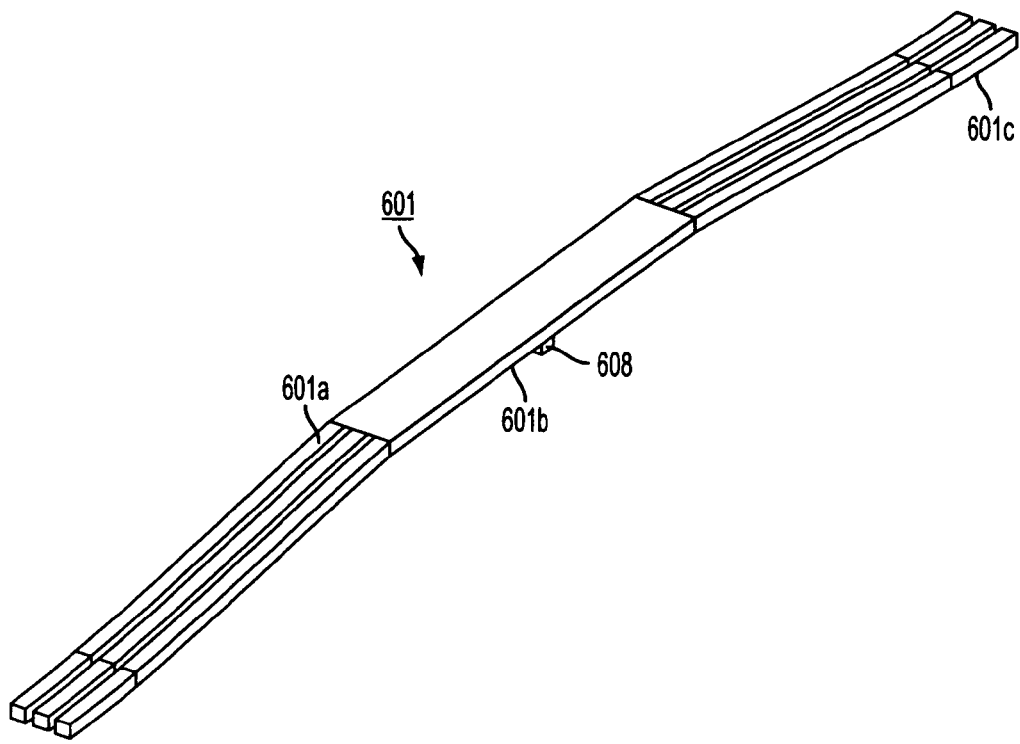

FIGS. 6A-B are exemplary diagrams of another embodiment of a latching system. As shown in FIG. 6A, the latching system 600 includes a latch 608 and an actuator 601. The latch 508 is formed to include an extension 608a on one end of the latch 508 so that the latch 508 is hook-shaped and may engage a latch receiver. The latch receiver may be shaped like the latch receiver 803 in FIG. 9A. As shown in FIG. 7A, the actuator 601 is formed asymmetrically to include a plurality of long and thin beams 601a that may be heated by applying power to each beam 601a. The asymmetrical structure of the actuator 601 may be formed by each beam 601a being thicker towards the center 601b of each beam (near the latch 608) and thinner towards the end 601c of each beam 601a. Due to the asymmetrical structure of the actuator 601, an imbalanced force is created between the thicker and thinner parts of each beam 601a when the beams 601a are heated. Thus, each beam 601a bulges up in the center 601b and moves vertically when power is applied to the beams 601a. The latch 608 moves vertically when the beams 601a move vertically. The movement of the thermal actuator 601 is shown in FIG. 7B. The latch 608 moves vertically to be positioned near the latch receiver. Once the power is removed from the actuator 601, the actuator 601 with the asymmetric beams 601a returns to the position shown in FIG. 7A, and the latch 608 engages the latch receiver so that the switch is held in a predetermined position.

In various exemplary embodiments, a 500 µm long actuator may move vertically by 11 µm when a temperature of each beam is increased by 600° C. Using layered structures with one composition on top of another composition may form the asymmetrical structure of the actuator 601. Due to a difference in thermal expansion coefficient of the two different compositions, the beams will bulge up when heated. The beams may be covered with a conductive coil structure (not shown) to create a magnetic field within the actuator 601. When power is applied to the conductive coil, the beams will be driven by the magnetic force of the conductive coil causing the beams to move vertically.

Figure 8A:
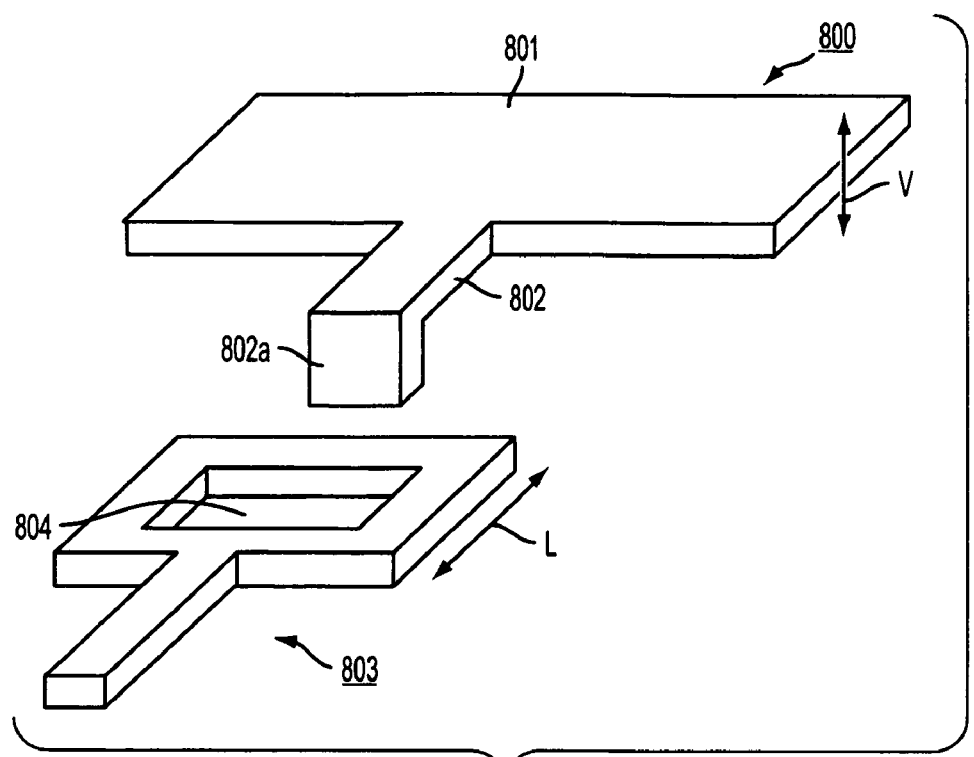
FIGS. 8A-B are exemplary diagrams of another embodiment of a latching system.
Figure 8B:
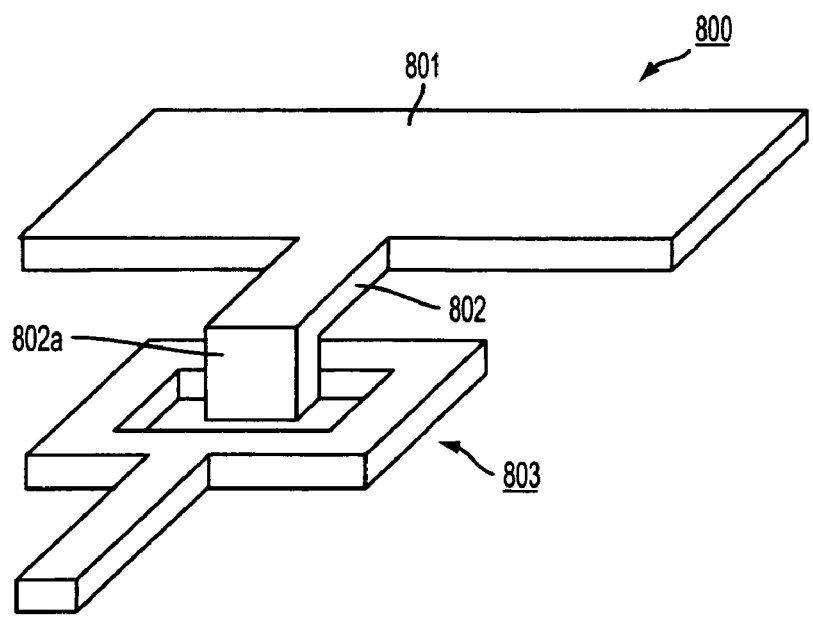

FIGS. 8A-B are exemplary diagrams of another embodiment of a latching system. As shown in FIG. 8A, a latching system 800 may include a plate 801, a latch 802, and a latch receiver 803 that includes an opening 804. The latch 802 may be formed to include an extension 802a on one end of the latch 802 so that the latch 802 is hook-shaped and may engage a latch receiver 803. The plate 801, latch 802 and latch receiver 803 may be composed of a same material. For example, the plate 801, latch 802 and latch receiver 803 may be composed of either a dielectric or conductive material. The plate 801 with the latch 802 may be positioned in a different plane as the latch receiver 803 prior to initiating the latching system. When the switch is operated, the latch receiver 803 is driven to move laterally (as shown by arrow L) to be near the opening 804 of the latch 802. Once the opening 804 of the latch receiver 803 is positioned to engage the latch 802, the plate 801 is driven so that the plate 801 and the latch 802 move vertically (as shown by arrow V). The plate 801 and the latch 802 are positioned to grasp the opening 804 of the latch receiver 803 once power is removed from the latching system. A locked position of the latching system 800 is shown in FIG. 8B.

Figure 9A:
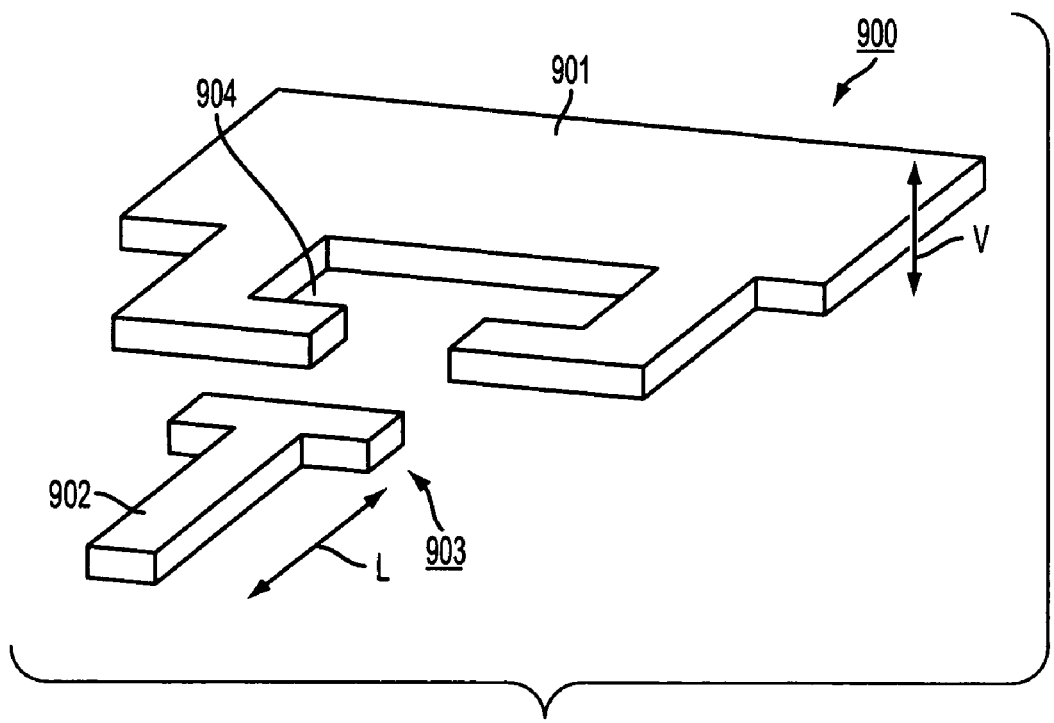
FIGS. 9A-B are exemplary diagrams of another embodiment of a latching system.
Figure 9B:
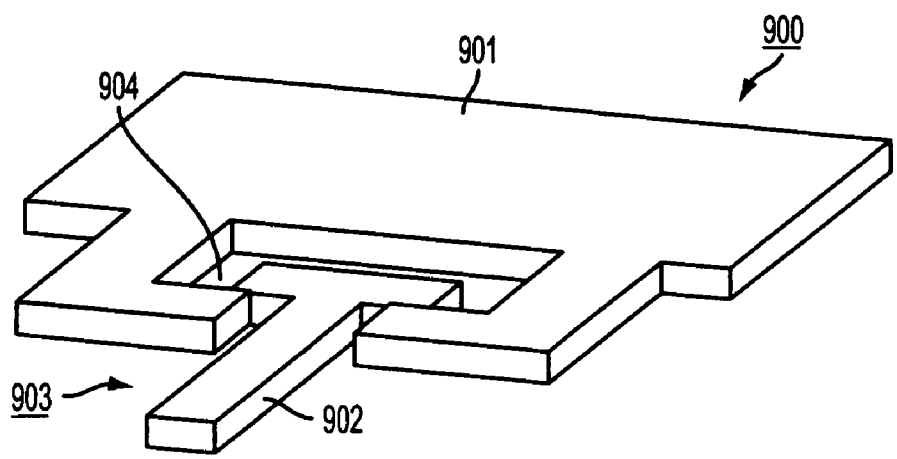

FIGS. 9A-B are exemplary diagrams of another embodiment of a latching system. As shown in FIG. 9A, the latching system 900 may include a plate 901 with a latch receiver 903 and a latch 902. The latch 902 may be formed to include an extension 902a on one end of the latch 902 so that the latch 902 may engage the latch receiver 903. The latch receiver 903 may include an opening 904. The plate 901 and latch 902 may be composed of different materials. For example, the plate 901 may be composed a dielectric material and the latch 902 may be composed of a conductive material. The plate 901 with the latch receiver 903 may be positioned in a same plane as the latch 902 prior to initiating the latching system. When the switch is operated, the plate 901 is driven to move in a vertical direction (as shown by arrow V). The latch 902 is subsequently driven to move in a lateral direction (as shown by arrow L) so that the opening 904 of the latch receiver 903 may engage the latch 902. The plate 901 is driven vertically once again and the latch 902 grasps the latch receiver 903 when power is removed from the latching system. A locked position of the latching system 900 is shown in FIG. 9B.

FIGS. 10A-B are exemplary diagrams of another embodiment of a latching system. As shown in FIG. 10A, an out-of-plane actuator system 1000 may be used for latching waveguides in a displaced state. FIG. 10B shows an exemplary detailed diagram of the out-of-plane actuator system 1000. A shuttle 1002 may include a latch 1001 and an actuator 1003 includes a latch receiver 1004 with an opening 1005. The shuttle 1002 may be driven in a lateral direction and the actuator 1003 may be adjusted in a vertical direction. The actuator 1003 may be formed predisposed to adjust out-of-plane (instead of in-plane motion) by using multiple beams 1006 that are grouped together by a series of crossbeams 1007. The rigidity out-of-plane with two beams is about twice that of a single beam. However, the in-plane rigidity scales as the width squared, so two 5 µm wide beams attached together with a 5 µm space in between and sufficient crossbars will be almost as rigid as a 15 µm wide beam, or $15^3/5^3=27$ times more rigid.

Thus, when the beam is compressed by thermal expansion, the easiest route to decreasing its energy is to move upward out-of-plane. Although FIG. 10A-B show the actuator 1003 formed of two beams 1006 grouped together for exemplary purposes only, it should be appreciated that any number of beams may be grouped together without departing from the spirit and scope of the disclosure. The actuator 1003 moves vertically "out-of-plane," for example, by electrostatic force or buckling due to thermal expansion. The actuator 1003 may be formed to be less than 50 µm wide in the direction perpendicular to the waveguide and the thermal actuators that move the waveguide, as compared to the 400 µm of a conventional latch discussed above. This configuration allows the overall switch to be reduced from approximately 550 µm wide to approximately 200 µm wide. On a 64-channel system, the structure reduces the width of the chip by approximately 2.25 cm. Moreover, the configuration avoids using a long beam to move the latch.

The actuator 1003 shown in FIG. 10B is adjusted by applying power through the beams 1006 and heating the beams 1006 until they buckle. As discussed above, the actuator 1003 that includes the beams 1006 may be formed so that the beams 1006 are predisposed to buckle upward and out-of-plane instead of downward toward the substrate. For example, the beams 1006 may be formed by depositing a stressy material to break vertical symmetry by adding thin film stress. Under typical conditions, metal has a tensile stress. Thus, forming a metal on the top and near the ends of the beams 1006 may cause the beams 1006 to curl upward. In an alternative embodiment, the beams 1006 may be formed to be thinner in predetermined sections so that compression will cause a bending movement (and decrease out-of-plane stiffness). Even if the vertical asymmetry does not exist in the beams 1006, the beams 1006 may still move upward if the compression is severe enough.

Figure 11:
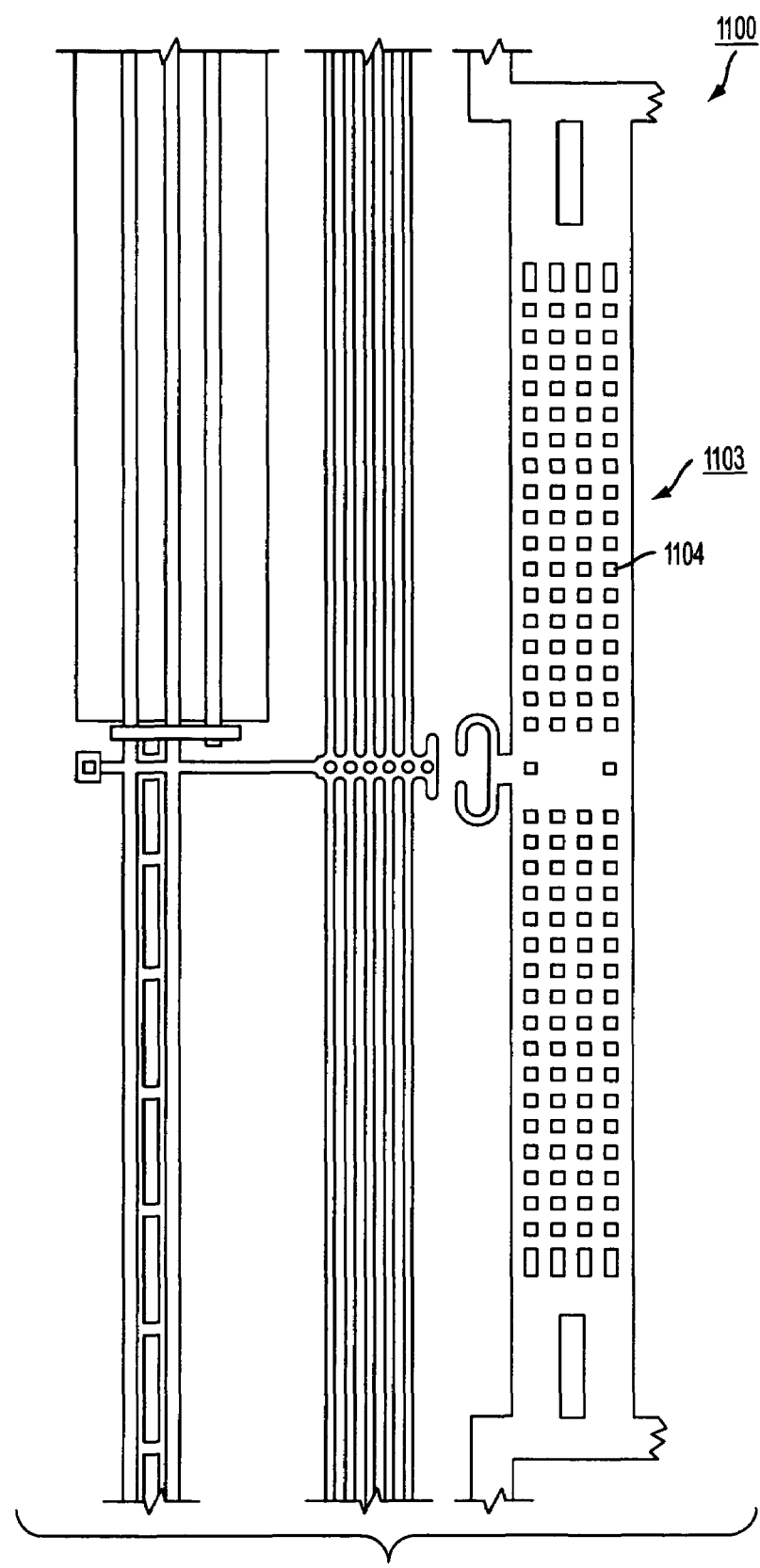
FIG. 11 is an exemplary diagram of another embodiment of a latching system.

FIG. 11 is an exemplary diagram of another embodiment of a latching system 1100. When thermal actuators are placed in an off mode by removing the applied power, the actuator transitions into a relaxed mode and exerts a restoring force that pulls back on the latch assembly. Additionally, the springs supporting the waveguide shuttle apply a restoring force to the latch assembly. The restoring force may be detrimental to the switch and cause optical loss through misalignment of the waveguide if the misalignment is, for example, a fraction of a micron. Thus, the out-of-plane actuator may be widened by using additional beams as shown in FIG. 11 to better predispose the actuator to out-of-plane motion. The actuator in FIG. 11 will not move in-plane, but will move out-of-plane. In order to decrease the displacement to less that 0.1 µm, the stiffness must increase about 350×. An actuator that is 45 µm wide should have stiffness $45^3/5^3=730$ times larger than the single beam.

The widened actuator 1103 may require etch holes 1104 to enable the release etch of an underlying oxide. 5 µm etch holes in a pattern as shown in FIG. 11 may lower the stiffness to about ⅔ of the solid beam value thus allowing for about 0.1 µm of in-plane displacement. Additional beams in the group should not change the desired out-of-plane motion as long as each beam has the same power, e.g., current, running through it as in a single-beam structure. Using this process, the total current will be 5× larger than for a single-beam structure. However, the amount of current required should still be low (approximately 25-100 mA, depending on resistivity). Because the latch is only powered for a few milliseconds, the total energy consumption will still be low.

FIGS. 12A-B are exemplary diagrams of another embodiment of a latching system. As shown in FIG. 12A, an out-of-plane actuator system 1200 may be used for latching waveguides in a displaced state. FIG. 12B shows an exemplary detailed diagram of the out-of-plane actuator system 1200. A shuttle 1202 may include a latch 1201 and an actuator 1203 includes a latch receiver 1204 with an opening 1205. The shuttle 1202 may be driven in a lateral direction and the actuator 1203 may be driven in a vertical direction. The actuator 1203 may move vertically "out-of-plane," for example, by electrostatic force or buckling due to thermal expansion in the beams 1206 when power is applied to the beams 1206. The beams may be connected by crossbars 1208.

As shown in FIG. 12B, the shuttle 1202 is driven laterally so that the latch 1201 is positioned near the latch receiver 1204. Then, the actuator 1203 with the latch receiver 1204 is driven vertically to engage the latch 1201 by removing power from the beams 1206. The latch 1201 returns to a relaxed position once power is removed from the beams connected the shuttle 1202. Because a displacement may occur in the shuttle 1202 location after the power is removed from the beams, while the latch 1201 is resting against the latch receiver 1204, mechanical stops 1207 may be used with this embodiment to eliminate any unacceptable displacement in the shuttle 1202. By using the mechanical stops 1207, the final position of the shuttle 1202 can be accurately predicted.

In this embodiment, the actuator 1203 may be positioned so that the restoring force of the shuttle 1202 pulls the actuator 1203 back against the mechanical stops 1207. For example, the mechanical stops 1207 may be positioned at least 2 µm from the actuator 1203 to form a gap shown in FIG. 12B. It may be necessary to decrease the in-plane stiffness of the actuator 1203 to make sure that the actuator 1203 fully relaxes against the mechanical stops 1207.

Figure 13A:
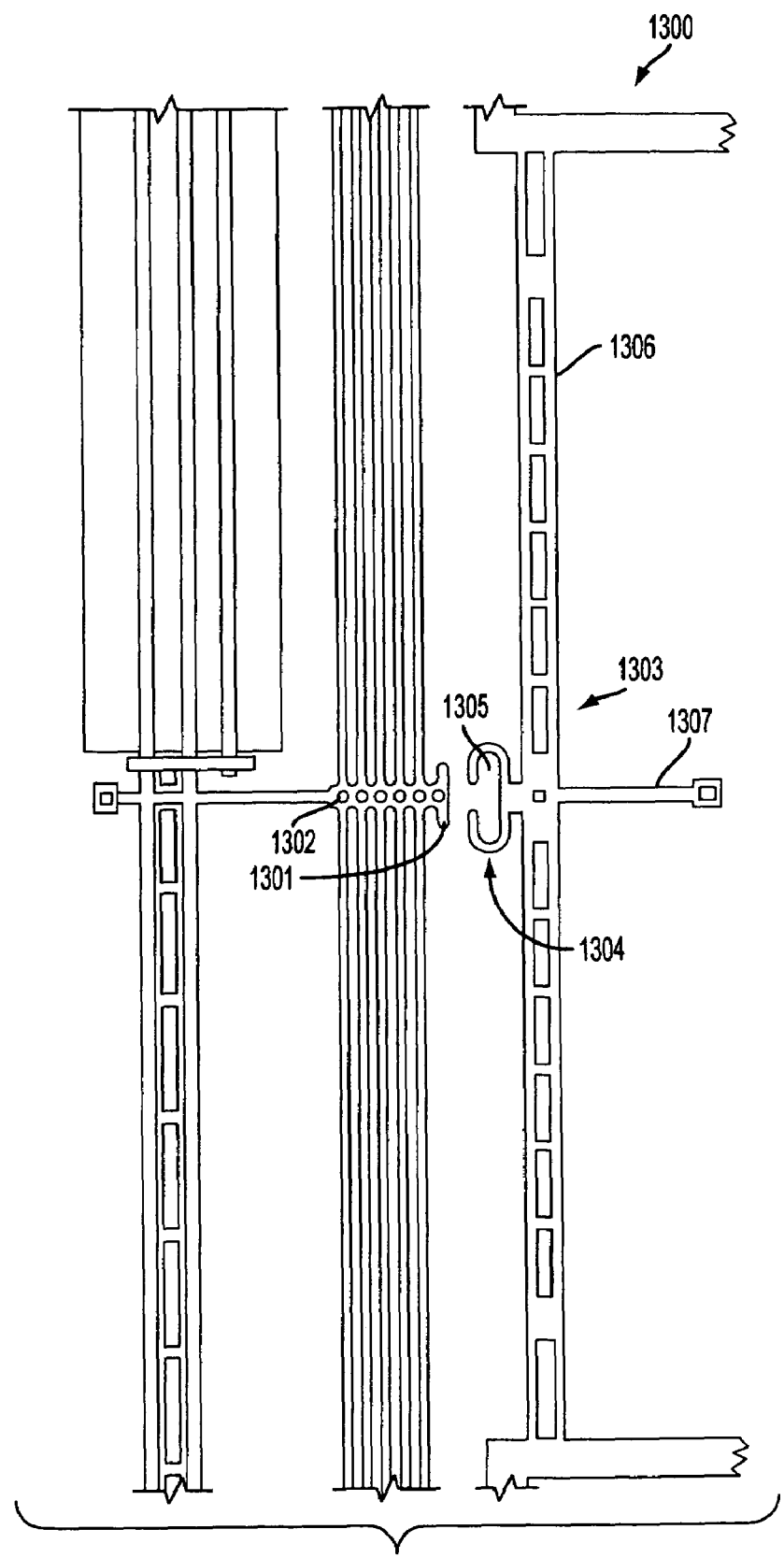
FIGS. 13A-B are exemplary diagrams of another embodiment of a latching system.
Figure 13B:
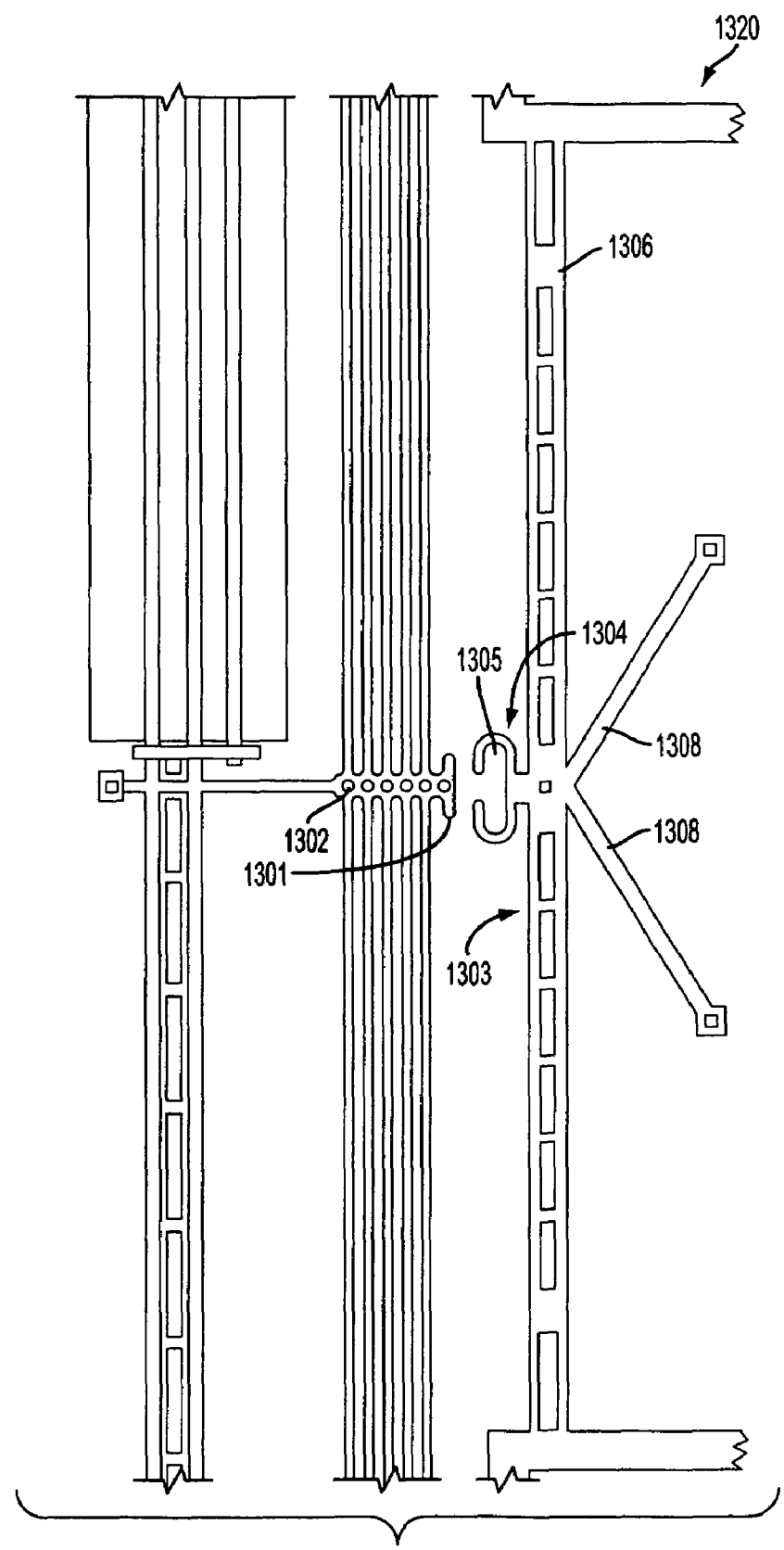

FIGS. 13A-B are exemplary diagrams of another embodiment of a latching system. As shown in FIGS. 13A-B, an out-of-plane actuator system 1300 may be used for latching waveguides in a displaced state. FIGS. 13A-B show an exemplary detailed diagram of two different actuator systems 1300 and 1320. In both systems, a shuttle 1302 may include a latch 1301 and an actuator 1303 includes a latch receiver 1304 with an opening 1305. The shuttle 1302 may be driven in a lateral direction and the actuator 1303 may be driven in a vertical direction. The actuator 1303 may move vertically "out-of-plane," for example, by electrostatic force or buckling due to thermal expansion in the beams 1306 when power is applied to the beams 1306.

As shown in FIGS. 13A-B, the shuttle 1302 is driven laterally so that the latch 1301 is positioned near the latch receiver 1304. Then, the actuator 1303 with the latch receiver 1304 is driven vertically to grasp the latch 1301 by removing power from the beams 1306. The latch 1301 returns to a relaxed position once power is removed from the beams connected the shuttle 1302. The embodiment in FIG. 13A prevents in-plane motion by attaching a long, thin, rope-like beam 1307 to a center point of the actuator 1303. The beam 1307 is also anchored at a position located away from the actuator 1303. The beam 1307, for example, may be composed of silicon. The beam 1307 prevents any leftward motion in the actuator 1303, in the direction that would stretch the beam 1307 and displace the shuttle 1302. For exemplary purposes only, if the beam 1307 is 5 µm wide, 2 µm tall and 50 µm long, the stretching induced by a 500 µN force pulling on the center is 0.015 µm, which is an acceptable displacement.

If the beam 1307 inhibits the out-of-plane motion of the actuator 1303, and the actuator 1303 is formed relatively weak, the embodiment in FIG. 13B may be used. As shown in FIG. 13B, a pair of beams 1308 are attached to the actuator 1303 at predetermined angles. The beams 1308 may be formed of silicon. Because of the symmetry, the displacement may require stretching of the beams 1308 (and possibly some bending), but the beams 1308 may be formed much longer than the beam 1307 in FIG. 13A without increasing the width of the switch. The two beams 1308, for example, may be twice as long as the single beam 1307 so that a total stiffness is $2\times(½)^3=¼$ of the original out-of-plane stiffness. The two beams 1308 stretch, but only half the distance compared to the single beams 1307. The beams 1308 may extend at an angle ranging from + or −90° from a direction substantially parallel to the motion of the latch. Thus, if the beams 1308 are 30° from vertical (as shown in FIG. 13B), a resulting displacement is approximately 0.015 µm, which is an acceptable displacement.

Figure 14:
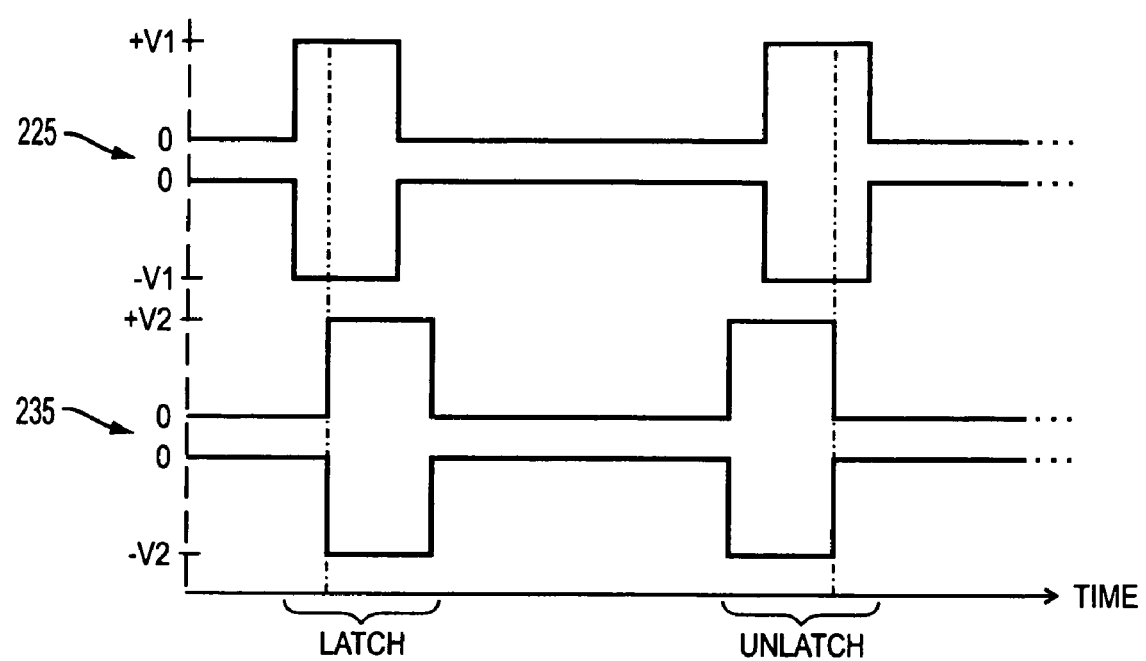
FIG. 14 is an exemplary diagram showing how voltage may be applied to the latching system.

FIG. 14 is an exemplary diagram showing how voltage may be applied to the latching system. Specifically, FIG. 14 shows a typical waveform used for latching and unlatching the device, with waveform 225 being applied to the latch thermal actuators and waveform 235 being applied to the driving actuator that switches the states. The voltage on the latch actuators is applied first to open up the latching teeth, and then the voltage is applied to the driving actuator to move the latch past the position of the latching teeth. The voltage on the latch actuators is then removed so that the latching teeth close, and then the voltage on the driving actuator is removed and the latch settles back against the teeth. The process is reversed for unlatching. The voltage may be applied first to the drive actuator so that the latch moves away from the latch teeth. The voltage may then be applied to the latch actuators, opening up the latching teeth. The voltage may then be removed first from the drive actuators and then the latch actuators, moving everything back to its original state.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A latching system, comprising:
    a latch formed to include an extension on one end of the latch, the latch being driven by power;
    a latch receiver that is formed to receive the latch;
    a plurality of beams connected to the latch, the latch and the plurality of beams defining a plane, and wherein the power is applied to the plurality of beams to drive the extension of the latch in a direction substantially perpendicular with respect to the plane defined by the latch and the plurality of beams so that the plurality of beams engage the latch receiver,
    wherein the plurality of beams include an asymmetric structure formed by each beam being thicker towards a center of each beam and thinner towards an end of each beam; and
    a controller that controls the extension of the latch to engage the latch receiver when the power is applied to the latch, and controls the extension of the latch to lock in place against the latch receiver when the power is removed from the latch.

2. The latching system of claim 1, wherein the plurality of beams are connected together by a plurality of crossbars.

3. The latching system of claim 1, the extension of the latch being driven in a direction substantially perpendicular to the plane defined by the latch and the plurality of beams when the power is applied to the latch, and the latch receiver being driven in a direction parallel to the plane defined by the latch when power is applied to the latch receiver.

4. The latching system of claim 3, the latch being positioned in a different plane from the latch receiver prior to initiating the latch.

5. The latching system of claim 4, the extension having a hook-like shape that engages an opening in the latch receiver when the power is applied to the latch, and the latch grasping the latch receiver when the power is removed from the latch receiver.

6. The latching system of claim 3, the latch being positioned in a same plane as the latch receiver prior to initiating the latch.

7. The latching system of claim 6, the extension extending in opposite directions parallel to the plane defined by the latch and the plurality of beams, engaging an opening in the latch receiver when the power is applied to the latch, and grasping the latch receiver when the power is removed from the latch.

8. The latching system of claim 1, the latch receiver being formed by two opposing finger-like extensions extending from an actuator, the actuator including a plurality of etch holes.

9. The latching system of claim 1 an actuator being connected to a beam acting as an anchor, the beam extending at an angle ranging from + or − 90° from a direction substantially parallel to the motion of the latch.

10. A method of using a latching system, comprising:
    driving a latch receiver formed to receive a latch, which includes an extension on one end of the latch and a plurality of beams connected to the latch, by applying power to the latch receiver;
    driving the latch in a direction substantially perpendicular to a plane defined by the latch and the plurality of beams by applying power to the latch,
    wherein the latch is driven by applying the power to the plurality of beams connected to the latch, the plurality of beams including an asymmetric structure, the asymmetric structure formed by each beam being thicker towards a center of each beam and thinner towards an end of each beam; and
    controlling the extension of the latch to engage the latch receiver when the power is applied to the latch, and controlling the extension of the latch to lock in place against the latch receiver when the power is removed from the latch.

11. The method of claim 10, wherein the latch is driven to engage the latch receiver using the plurality of beams, the plurality of beams being connected together by a plurality of crossbars.

12. The method of claim 10, wherein the latch is driven in a direction substantially perpendicular to the plane defined by the latch and the plurality of beams when the power is applied to the latch, and wherein the latch receiver is driven in a direction substantially parallel to the plane defined by the latch and the plurality of the beams when power is applied to the latch receiver.

13. The method of claim 12, the latch being positioned in a plane different from the plane of the latch receiver prior to initiating the latch.

14. The method of claim 13, the extension having a hook-like shape that engages an opening in the latch receiver when the power is applied to the latch, and the hook-like shape grasping the latch receiver when the power is removed from the latch receiver.

15. The method of claim 12, the latch being positioned in a same plane as the latch receiver prior to initiating the latch.

* * * * *